(12) United States Patent
Amrhein et al.

(10) Patent No.: US 9,141,710 B2
(45) Date of Patent: *Sep. 22, 2015

(54) PERSISTING ANNOTATIONS WITHIN A COBROWSING SESSION

(75) Inventors: Dustin K. Amrhein, Cedar Park, TX (US); Erik J. Burckart, Raleigh, NC (US); Andrew Ivory, Wake Forest, NC (US); Aaron K. Shook, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 561 days.

This patent is subject to a terminal disclaimer.

(21) Appl. No.: 12/913,367

(22) Filed: Oct. 27, 2010

(65) Prior Publication Data

US 2012/0110472 A1 May 3, 2012

(51) Int. Cl.
*G06F 3/00* (2006.01)
*G06F 17/30* (2006.01)

(52) U.S. Cl.
CPC ................ *G06F 17/30873* (2013.01)

(58) Field of Classification Search
CPC ...... H04L 65/403; G06F 17/241; G06F 3/048
USPC ................... 715/753, 230, 232, 738
See application file for complete search history.

(56) References Cited

U.S. PATENT DOCUMENTS

| | | | | |
|---|---|---|---|---|
| 6,119,147 A * | 9/2000 | Toomey et al. | ............... | 709/204 |
| 6,230,171 B1 * | 5/2001 | Pacifici et al. | ............... | 715/751 |
| 6,826,595 B1 * | 11/2004 | Barbash et al. | ............... | 709/204 |
| 6,938,212 B2 * | 8/2005 | Nakamura | ............ | 715/748 |
| 7,149,776 B1 * | 12/2006 | Roy et al. | ............ | 709/201 |
| 7,370,269 B1 * | 5/2008 | Prabhu et al. | ............... | 715/751 |
| 8,010,901 B1 * | 8/2011 | Rogers | ............ | 715/751 |
| 8,015,496 B1 * | 9/2011 | Rogers | ............ | 715/751 |
| 8,788,584 B2 * | 7/2014 | Huxley | ............ | 709/204 |
| 2001/0016872 A1 * | 8/2001 | Kusuda | ............ | 709/205 |
| 2003/0023679 A1 * | 1/2003 | Johnson et al. | ............ | 709/204 |
| 2004/0172595 A1 * | 9/2004 | Lerner et al. | ............ | 715/512 |
| 2006/0010368 A1 * | 1/2006 | Kashi | ............ | 715/512 |
| 2006/0031755 A1 * | 2/2006 | Kashi | ............ | 715/512 |
| 2007/0118794 A1 * | 5/2007 | Hollander et al. | ............ | 715/512 |
| 2007/0288569 A1 * | 12/2007 | Yuan et al. | ............ | 709/204 |
| 2009/0292618 A1 | 11/2009 | Chatila | | |
| 2010/0030578 A1 * | 2/2010 | Siddique et al. | ............ | 715/753 |

OTHER PUBLICATIONS

Sharedcopy—Annotate & Collaborate on Any Webpage, "http://www.sharedcopy.com," as published on Jul. 24, 2008.*

(Continued)

*Primary Examiner* — Dino Kujundzic
(74) *Attorney, Agent, or Firm* — Patents on Demand P.A.; Brian K. Buchheit; Scott M. Garrett

(57) ABSTRACT

A request to navigate to a Uniform Resource Identifier (URI) can be received within a cobrowsing session. The cobrowsing session can be associated with a unique session identifier of a cobrowsing application. The cobrowsing application can be part of a collaboration software. An annotation previously associated with the URI from a historic cobrowsing session can be retrieved. Content associated with the URI can be obtained and presented within an interface associated with the cobrowsing session. The annotation can be presented within the content associated with the URI of the interface.

20 Claims, 3 Drawing Sheets

(56) References Cited

OTHER PUBLICATIONS

Twiddla http://www.twiddla.com, as published in 2012.
A Proxy-Based Infrastructure for Web Application Sharing and Remote Collaboration on Web Pages Richard Atterer, et al. Proceedings of the 11th IFIP TC 13 International Conference on Human-Computer Interaction; pp. 74-87 Year of Publication: 2007.
Groupweb: A www Browser as Real Time Groupware Saul Greenberg, et al. Conference on Human Factors in Computing Systems; pp. 271-272 Year of Publication: 1996.

* cited by examiner

PERSISTING ANNOTATIONS WITHIN A COBROWSING SESSION

BACKGROUND

The present invention relates to the field of collaboration software and, more particularly, to persisting annotations within a cobrowsing session.

Cobrowsing is becoming an increasingly important tool within the enterprise collaborative software domain. Cobrowsing can permit multiple users to joint navigate one or more Web resources (e.g., Web pages). That is, several users can view the same Web pages simultaneously while participating in a collaboration session. For example, users participating in a Web conference can be presented with a Web page which a moderator has selected based on a navigation action (e.g., selecting a hyperlink). These cobrowsing sessions are enabled typically through cobrowsing applications which can often take the form of Web applications and/or widgets which execute inside a Web browser. These applications are typically initiated from a special Uniform Resource Locator (URL) associated with the application. This URL initializes the application and permits synchronized navigation (e.g., cobrowsing) within the application to occur.

Traditional annotations are stored via associating the URL of a Web page with the annotation. This approach, however, fails when a cobrowsing session is initiated. Consequently, these annotations are lost when the cobrowsing session is terminated due to the mechanism in which the annotations are handled. Web page navigation is performed by the application and thus the browser URL remains unchanged regardless of the URL (e.g., Web page) requested within the cobrowsing session. That is, the browser reflects a URL of the cobrowsing application which is different from the URL managed by the application (e.g., the URL requested). Due to this mechanism, it is often difficult for cobrowsing applications to permit user created annotations to persist between sessions.

One mechanism is to store Web browser session data externally via third party tools by obtaining the URL of the Web browser. However, since the URL of the Web browser is the cobrowser application URL, the annotations cannot be extracted since application data is private to the application and cannot be accessed by third party tools readily. Further, this technique can be cumbersome and limited in its usability. Once exported from the cobrowsing session, the annotations can lose meaning because it has been removed from the context of the session (e.g., the Web page associated with it). For instance, when an annotation is extracted, the metadata and/or contextual information that it is associated with is not exported, leaving the annotation without a context which can erode the usability of the annotation. Further, this technique requires manual manipulation of annotations which can be a time consuming and error-prone process.

SUMMARY

A request to navigate to a Uniform Resource Identifier (URI) can be received within a cobrowsing session. The cobrowsing session can be associated with a unique session identifier of a cobrowsing application. The cobrowsing application can be part of a collaboration software. An annotation previously associated with the URI from a historic cobrowsing session can be retrieved. Content associated with the URI can be obtained and rendered within an interface associated with the cobrowsing session. The annotation can be presented within the content associated with the URI of the interface.

DETAILED DESCRIPTION

Figure 1:
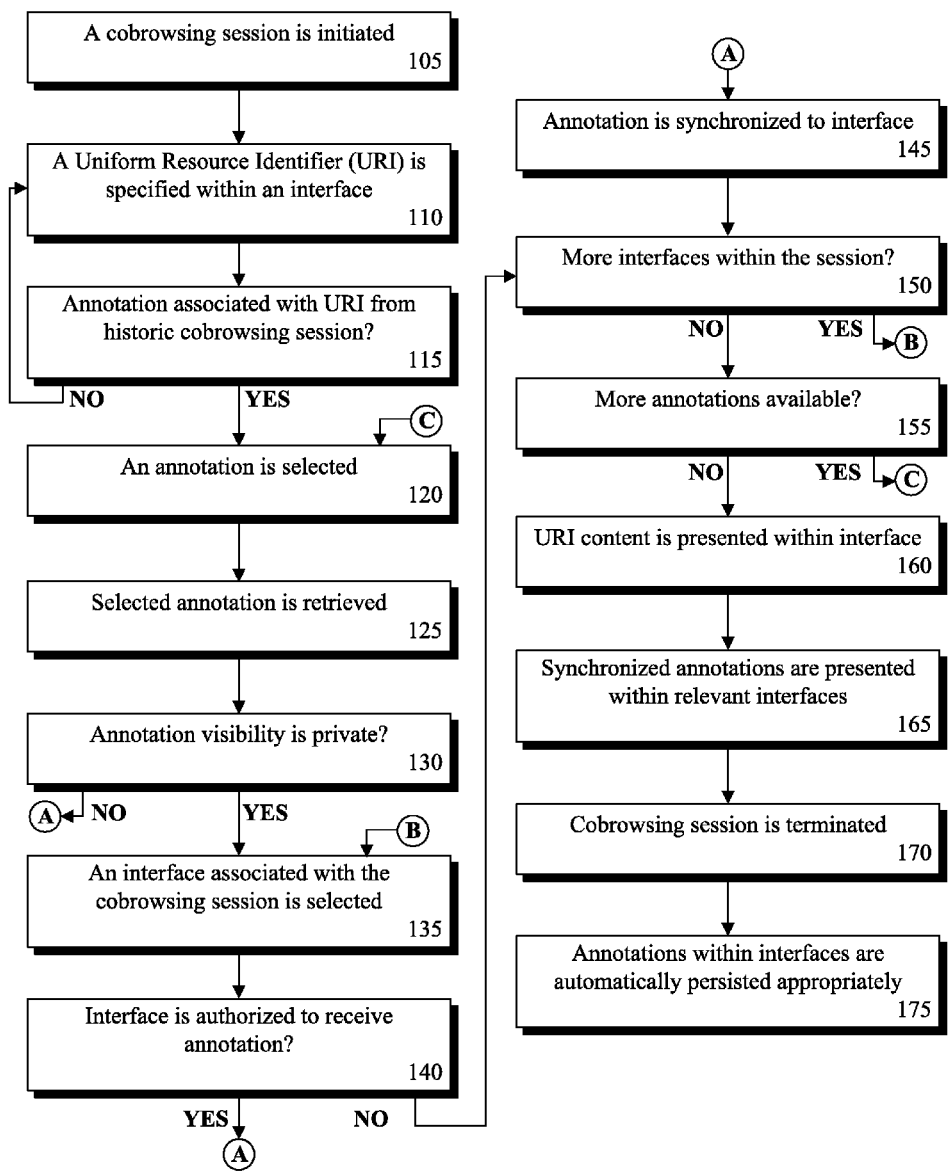
FIG. 1 is a flowchart illustrating a method for persisting annotations within a cobrowsing session in accordance with an embodiment of the inventive arrangements disclosed herein.

The present disclosure is a solution for persisting annotations within a cobrowsing session. In the solution, annotations created within a cobrowsing session of a cobrowsing application can be automatically persisted natively. That is, annotations can be retrieved after the cobrowsing session is terminated and a new cobrowsing session is initiated. The annotation, associated with a Uniform Resource Identifier (URI), can be presented when the URI is requested and presented within a cobrowsing session. Permissions associated with the annotation can permit the annotation to be shared among participants of a cobrowsing session. For example, an annotation can configured to be visible and editable to selected participants of a cobrowsing session.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a method 100 for persisting annotations within a cobrowsing session in accordance with an embodiment of the inventive arrangements disclosed herein. In method 100, an annotation created within a cobrowsing session can be automatically persisted and synchronized to selected interfaces utilized by participants within the cobrowsing session. That is, an annotation can be permanently stored and accessed within a future cobrowsing session. During the cobrowsing session, annotations can be modified by participants and can be automatically synchronized permitting participants to view and/or modify the same annotation. In one instance, the method 100 can be performed in real-time, enabling dynamic persistent annotative actions to be achieved within a cobrowsing session.

As used herein, cobrowsing can be the joint navigation of two or more communicatively linked interfaces accessing a Web resource. Cobrowsing session include a semi-permanent interactive exchange between two or more interfaces participating in cobrowsing. An interface can refer to a user interface associated with a computing device and/or a participant. A participant can include, but is not limited to a user, a group of users, and the like utilizing an interface to interact within a cobrowsing session. Annotations can be presented within the interface which can include, but is not limited to, a Web browser, an application interface, and the like.

In step 105, a cobrowsing session is initiated. The cobrowsing session can be associated with a cobrowsing application including, but not limited to, desktop collaboration software, Web-based application, widget, and the like. In step 110, a Uniform Resource Identifier (URI) can be specified within an interface associated with the application. For example, a participant can manually input a Uniform Resource Locator (URL) within a Web browser to initiate a cobrowsing session. In step 115, if an annotation is associated with the URI from a historic cobrowsing session, the method can proceed to step 120, else return to step 110. In step 120, an annotation from a historic cobrowsing session is automatically selected.

In step 125, the selected annotation can be retrieved from a data source. The data source can include, but is not limited to, an application server, remote data store, local data store, and the like. In step 130, if the annotation visibility property is configured to private, the method can proceed to step 135, else continue to step 145. The visibility property can dictate which interfaces and consequently which participants can view an annotation. The visibility property can be configured based on user identity, groups, computing device identifiers, and the like. In step 135, an interface associated with the cobrowsing session can be selected. The interface can be associated with a cobrowsing application executing on a computing device utilized by a participant of the cobrowsing session. In step 140, if the interface (e.g., participant utilizing an interface) is authorized to receive the selected annotation, the method can proceed to step 145, else proceed to step 150. Authorization can include user credentials verified against a user group associated with the visibility property of the annotation. For example, if an annotation is configured for the group customer service representatives, only users of the group can be permitted to receive (e.g., view) the annotation.

In step 145, the selected annotation can be synchronized to the authorized interface. In step 150, if there are more interfaces within the session then the method can return to step 135, else continue to step 155. In step 155, if there are more annotations available, the method can return to step 120, else proceed to step 160. In step 160, the URI content (e.g., Web page) can be presented within the interface. In step 165, synchronized annotations can be presented within the relevant interfaces. In step 170, the cobrowsing session can be terminated. In step 175, annotations within the interfaces can be automatically persisted appropriately upon session termination.

Drawings presented herein are for illustrative purposes only and should not be construed to limit the invention in any regard. Steps 120-155 can be performed continuously throughout the cobrowsing session enabling annotations to be used in real-time during the session. It should be understood when annotation visibility is public, the method can convey and/or synchronize annotations to each interface participating in the cobrowsing session (e.g., steps 145-155). It should also be appreciated that the cobrowsing session can be initiated via one or more automated and manual mechanisms.

Figure 2:
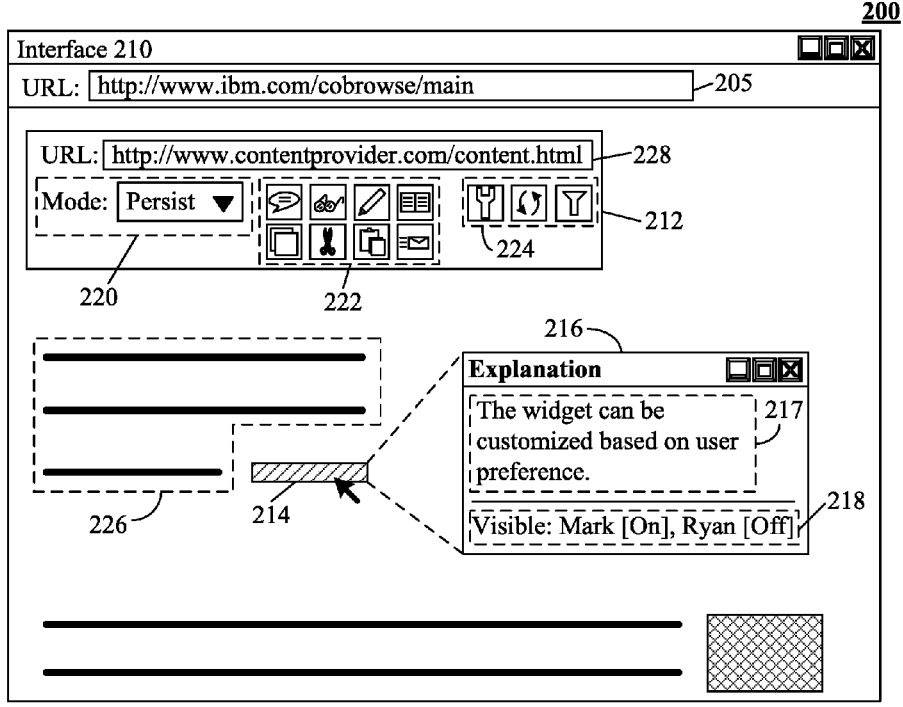
FIG. 2 is a schematic diagram illustrating a set of interfaces for persisting annotations within a cobrowsing session in accordance with an embodiment of the inventive arrangements disclosed herein.
Figure 2:
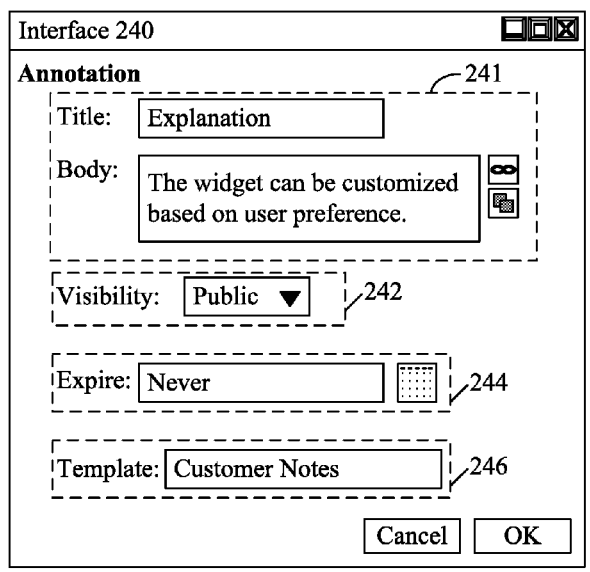

FIG. 2 is a flowchart illustrating an interface 210, 240 for persisting annotations within a cobrowsing session in accordance with an embodiment of the inventive arrangements disclosed herein. Interface 210, 240 can be present within the context of method 100 and system 300. Interface 210 can be a user interface associated with a collaboration software for interacting with annotations within a cobrowsing session. For instance, interface 210 can be a cobrowsing Web application (e.g., Uniform Resource Locator 205) executing within a Web browser. Interface 210 can present content 226 and annotation 217 associated with Uniform Resource Locator (URL) 228. Interface 240 can be a configuration screen permitting user specified settings to be applied to an annotation. In one embodiment, interface 240 can be a screen from a cobrowsing application.

In interface 210, annotation 217 can be presented within the cobrowsing application via an annotation frame 216. Annotation frame 216 can comprise of, but is not limited to, annotation title, annotation 216, visibility property 218, pagination controls, and the like. Annotation frame 216 can include frame controls including, but not limited to, minimize frame, maximize frame, hide frame, and the like. For example, annotation frame 216 can inherit interface properties from the cobrowsing application such as window controls. Annotation 217 can be presented within frame 216 based on user specified configuration, including, but not limited to, font size, font face, font family, font color, and the like. For instance, annotation frame 216 can include ruled lines which annotation 217 can be presented upon, mimicking a handwritten note.

In one instance, annotation 217 can be associated with media including, but not limited to, images, video, audio, and the like. In the instance, the associated media can be presented within frame 216. In another instance, annotation 217 can include Uniform Resource Identifiers (URIs), URLs, and the like. In the instance, additional resources can be linked to via a hyperlink presented within frame 216. It should be appreciated that annotation frame 216 can be optionally omitted based on configuration options permitting annotation 217 to be presented as a simple text overlay. In one embodiment, Cascading Style Sheet (CSS) can be utilized to overlay annotation 217 within content 226.

In one instance, annotation 217 can be presented within a customized graphic. In the instance, annotation 217 can be conformed to a handwritten note displayed within an adhesive note graphic. For example, annotation frame 216 can be a graphic of a yellow sticky note comprising of note 217 which can be positioned next to content 226.

In one embodiment, annotation 217 can be positionable permitting customizable location placement. In the embodiment, annotation 217 position can be tracked utilizing one or more traditional and/or proprietary mechanisms. In one instance, annotation 217 can be mapped to a Cartesian coordinate system. Annotation position can include multiple position values utilized to present frame 216, placeholder 214, and the like.

In one embodiment, annotation placeholder 214 can be presented within interface 210 proximate to content 226 indicating an annotation 216 is associated with content 226. In the embodiment, placeholder 214 can be a graphic icon, text block, and the like. In one configuration of the embodiment, interface frame 216 can be dynamically presented upon interaction with placeholder 214. For example, when a mouse cursor hovers over placeholder 214, annotation 217 can be presented within annotation frame 216. In one instance, annotation 217 can be linked to other features including, but not limited to, highlight, underline, and the like. For example, an annotation can be linked to a highlighted portion of content 226.

In one embodiment, annotation toolbar 212 can be a component of a cobrowsing application and/or cobrowsing widget enabling persistent annotations to be utilized, customized, and/or managed. Annotation toolbar 212 can include, but is not limited to, mode identifier 220, functions 222, configuration options 224, and the like. In one instance, toolbar 212 can be an overlay (e.g., floating toolbar) which can be optionally presented based on application settings.

Visibility property 218 can be an automatically and/or manually established value for controlling the propagation of annotation 217. Visibility property 218 can be configured through toolbar 218, context menu settings, drop down menu options, and the like. In one embodiment, an annotation visibility setting can be presented within frame 216 indicating which participants can view the annotation and which participants cannot. For instance, an annotation 217 can be visible by a participant Mark, but hidden from participant Ryan.

Mode identifier 220 can be used to indicate and/or control the operational mode for annotations. Operational mode can include, but is not limited, session persistence, intra-session persistence, and the like. For instance, selection of session persistence can enable annotations to behave similar to traditional cobrowsing annotation, expiring after the session is terminated. Mode identifier 220 can be a drop-down selection box, radio dialog, and the like.

Functions 222 can permit management of annotations within interface 210. Functions 222 can include, but is not limited to annotation, creation, modification, history, copying, sharing features (e.g., email), and the like. In one instance, functions 222 can permit toggling visibility of annotations within interface 210. In another instance, functions 222 can permit access to annotation history. In the instance, annotation history can include, but is not limited to, session history, intra-session history, and the like.

Configuration options 224 can permit user-specific settings to affect annotation behavior and/or presentation. Options 244 can include, annotation options (e.g., interface 240), synchronization settings, filter settings, and the like. Annotation options can include, but is not limited to, visibility configuration, expiration settings, and the like. Synchronization settings can include, but is not limited to, prioritization settings, synchronization timing options, and the like. In one instance, synchronization settings can permit priority values to be associated with annotations to enable real-time resource allocation to be achieved. For instance, in scenarios where network bandwidth is limited, annotation priority can be configured to a low priority to permit cobrowsing navigation to take precedence. Filter settings can permit selective filtering of annotations based on one or more criteria including, but not limited to annotation, content, title, visibility property, color, and the like. For example, a filter can be established to show only annotations from a specific user and/or group.

In interface 240, annotation configuration can be customized based on user specific settings and/or system default settings. Interface 240 can comprise of annotation settings including, but not limited to, title, annotation, visibility property 242, expiration setting 244, template option 246, and the like. In one instance, interface 240 can be a pop-up dialog which can permit dynamic and/or real-time configuration of an annotation within a cobrowsing session. In another instance, interface 240 can be a component of an administrative configuration interface associated with system 300.

In section 241, details of an annotation can be modified including, but not limited to, title, annotation text, media, URL, and the like. Section 241 can conform to traditional text editing fields such as a Hypertext Markup Language (HTML) text box. Customized tools can be integrated into section 241 including, but not limited to, a spell checker, dictionary, thesaurus, auto-completion, and the like.

In section 242, the visibility property of an annotation can be easily configured. In one embodiment, the visibility property can be presented as a drop-down selection box, permitting user selection of available visibility settings. Visibility settings can include, but is not limited to, public, private, and the like. In one embodiment, visibility setting can be dynamically adjusted enabling real-time configuration of an annotation visibility. In one embodiment, visibility settings can permit an administrator (e.g., moderator) to tie annotations to particular users.

In section 244, annotation expiration options can be configured based on one or more criteria. Options can include, but is not limited to, session expiration, intra-session expiration, timestamped expiration, and the like. In one embodiment, an annotation can be configured to persist indefinitely.

In section 246, annotations can be derived from pre-defined templates which can enable rapid creation and customization. Section 246 can enable selection of a template which can automatically configure an annotation based on template settings. Template settings can include, but is not limited to, title, annotation, visibility, expiration, and the like. For example, a template for customer specific notes can be established to allow a customer service representative to rapidly create customer specific notes during a cobrowsing session.

Drawings presented herein are for illustrative purposes only and should not be construed to limit the invention in any regard. Functionality of interface 210, 240 described herein can be encapsulated within a drop-down menu, context menu, and the like. Interface 210, 240 elements can include, but is not limited to, checkboxes, radio dialogs, drop-down selection boxes, text box, text areas, and the like. In one instance, interface 210, 240 can be a screen from a desktop cobrowsing application. In one embodiment, annotation 217 can support redaction capabilities. For example, a user within a cobrowsing session can redact one or more portions of an annotation in real-time. In one instance, free form annotations and/or hand drawn annotations can be supported within interface 210. It should be appreciated that functionality described herein can be a portion of a DOJO toolkit permitting rapid development and modification of interface 210, 240 features.

As used herein, content 226 can include, but is not limited to, Web-based content, Web application content, document content, and the like. It should be understood that content 226 can remain unmodified by annotation 217.

Figure 3:
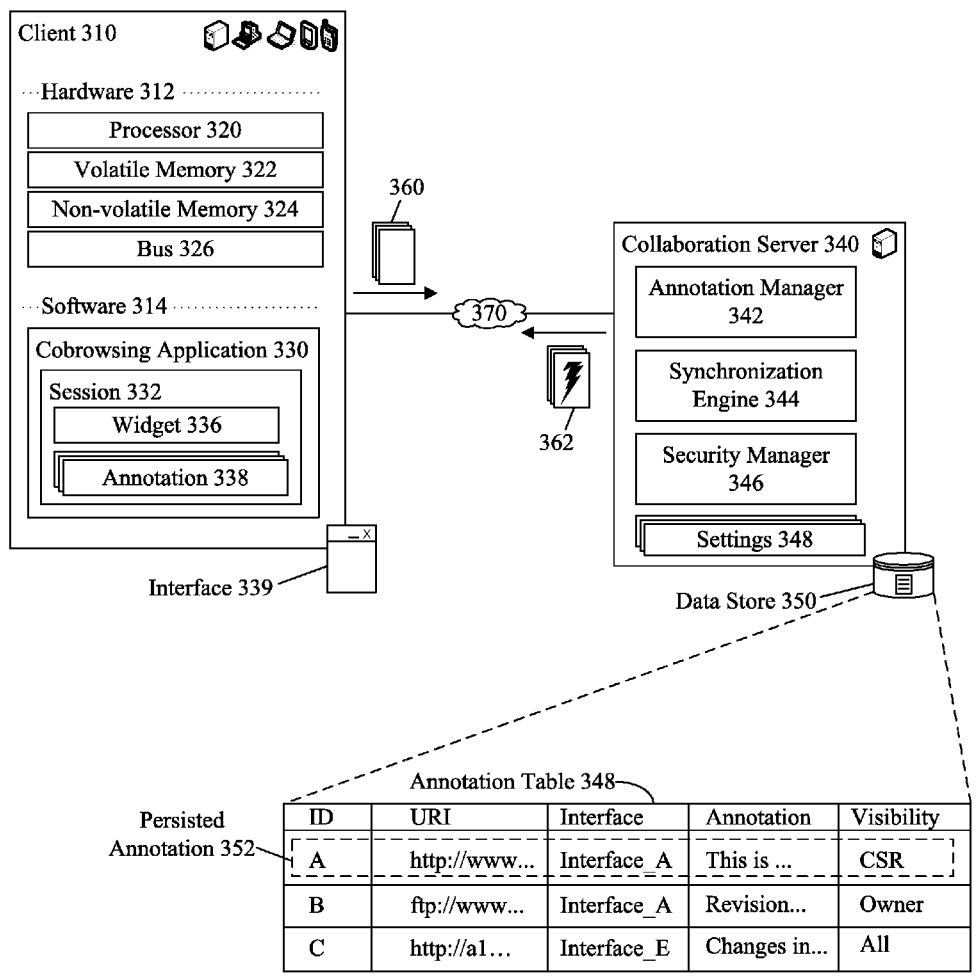
FIG. 3 is a schematic diagram illustrating a system for persisting annotations within a cobrowsing session in accordance with an embodiment of the inventive arrangements disclosed herein.

FIG. 3 is a schematic diagram illustrating a system 300 for persisting annotations within a cobrowsing session in accordance with an embodiment of the inventive arrangements disclosed herein. System 300 can be present in the context of method 100. In system 300, a collaboration server 340 can permit annotations to persist between cobrowsing sessions utilizing session data (e.g., annotation table 348). System 300 components can be communicatively linked via network 370.

In one embodiment, server 340 can be a component of a Service Oriented Architecture (SOA).

In system 300, a cobrowsing application 330 can be associated with an interface 339. Interface 339 can be a user interface including, but not limited to, graphical user interface, text interface, mixed-mode interface, and the like. For example, interface 339 can be a dynamically generated Rich Internet Application (RIA) interface.

Annotation table 348 can be a portion of a cobrowsing session 332 metadata stored within data store 350. Table 348 can be utilized to track annotation 338 which can store annotation 338 as persisted annotation 352. Table 348 can be a portion of a database including, but not limited to, Relation Database Management System (RDBMS), Object Oriented Database Management System (OODBMS), and the like. It should be appreciated, table 348 can be stored within a network attached storage (NAS) element, storage attached network (SAN), client 310, and the like.

Persisted annotation 352 can be an instance of annotation 338 which can be stored within table 348. Persisted annotation 352 can comprise of, but is not limited to, annotation identifier, Unified Resource Identifier (URI), interface identifier, annotation, visibility property, expiration value, and the like. Persisted annotation 352 can be communicated to application 330 upon initiation of session 332. Upon termination of session 332, annotation 338 can be conveyed to server 340 which can store the annotation 338 within table 348. In one embodiment, changes to annotation 338 can overwrite persisted annotation 352. In another embodiment, changes to annotation 338 can be stored separately from persisted annotation 352 enabling a change history to be cataloged. In one configuration of the embodiment, changes can be stored as deltas of the original annotation 352.

Widget 336 can be a Web-based application able to execute within application 330. For example, widget 336 can be an IBM IWIDGET. Annotation 338 can be a user specified note presented within cobrowsing application which can be manipulated via widget 336. In one embodiment, widget 336 can be utilized to manage every annotation within session 332. In another embodiment, multiple instances of widget 336 can be executed to manage each annotation within session 332. In yet another instance, widget 336 can be an optional component.

Cobrowsing application 330 can be a software entity permitting annotated cobrowsing within session 332 to occur. Cobrowsing application 330 can be used to initiate, manage, and terminate session 332. For instance, cobrowsing application 330 can be a Web browser able to navigate to a Uniform Resource Locator (URL) associated with a collaboration application. Application 330 technology can include, but is not limited to, JAVA 2 ENTERPRISE EDITION (J2EE), Javascript, Hypertext Markup Language (HTML), Extensible Markup Language (XML), and the like.

Session 332 can be initiated through user interaction within interface 339. In one instance, session 332 can be initiated from a cobrowsing invitation presented within interface 339. In another instance, session 332 can be automatically instantiated when application 330 is executed. Session 332 can comprise of widget 336, annotation 338, and like. It should be appreciated that session 332 can be stateful, stateless, and the like.

Collaboration server 340 can be a hardware/software entity permitting annotations within a cobrowsing session to be persisted. Server 340 can include, but is not limited to, annotation manager 342, synchronization engine 344, security handler 346, settings 348, data store 350, and the like. Server 340 can be associated with additional server and/or services to enable system 300 functionality. For example, server 340 can be associated with a network time protocol (NTP) service enabling accurate timing to be maintained for synchronization processes within system 300. In one embodiment, server 340 can be a component of a proxy server (e.g., Hypertext Transport Protocol proxy).

Annotation manager 342 can be a hardware/software component for handling annotations within a cobrowsing session 332. Manager 342 can provide annotation functionality associated with application 330. Manager 342 can be used to create, modify, and/or delete annotations within a cobrowsing session. In one instance, manager 342 can utilize unique annotation identifiers to manipulate annotations. In the instance, each annotation can be associated with a unique identifier enabling each annotation to be accessed independently of a cobrowsing session. In one embodiment, manager 342 can expose an application programming interface (API) enabling widget 336 to perform annotative functions. That is, service side functionality can be exposed to client side interfaces. In one instance, manager 342 functionality can be encapsulated within a portion of interface 339 and/or widget 336. For example, manager 342 can be a portion of a client side widget 339. Annotation event 360 can be received by annotation manager 342 which can process event 360 based on event type.

Synchronization engine 344 can be a hardware/software component permitting synchronization of annotation 338 for each application 330 participating in a cobrowsing session. Synchronization engine 344 can permit synchronous and asynchronous modes of execution based on settings 348. Engine 344 can respond to annotation event 360 which can trigger a synchronization event 362 to occur. In one instance, synchronization engine 344 can utilize annotation identifiers to determine relevant annotations 338 which require synchronization.

Annotation event 360 can be a user triggered generated event based on user interaction with application 330 and/or widget 336. Event 360 can be distinguished by event types which can include, but is not limited to, annotation creation, annotation modification, annotation deletion, annotation synchronization, and the like. In one instance, event 360 can be a custom event defined within settings 348 permitting robust customization to be achieved. For example, event 360 can be a specialized batch processing command allowing easy manipulation of numerous annotations.

Synchronization event 362 can be a programmatically generated event enabling harmonizing of annotation 338 within session 332. Event 362 can trigger synchronization of one or more annotations within session 332. Event 362 can include, but is not limited to, annotation content, annotation settings, and the like. Event 362 can be conveyed to widget 336 which can present synchronized content of annotation 338. In one instance, event 362 can be manually triggered via a user initiated event (e.g., synchronization command).

Security manager 346 can be a hardware/software component for handler annotation visibility within session 332. Manager 346 functionality can include, but is not limited to, authentication, validation, login management, and the like. Manager 346 can be utilized to escalate and/or demote annotation visibility privileges. Manager 346 can be communicatively linked to services which can be used to authenticate and/or validate interface authorization. In one instance, a directory service can be utilized to identify a user and determine user privileges for an interface associated with session 332. In another instance, third party authentication mechanisms can be communicatively linked to provide extensible security functionality. For instance, manager 346 can be integrated with an OPENID authentication framework permitting users to utilize existing digital identities.

Settings 348 can be one or more configuration parameters for establishing the behavior of server 340. Settings 348 can include, but is not limited to, synchronization settings, annotation specific settings, security settings (e.g., visibility controls), administrative settings, and the like. Settings 348 can be accessible through one or more interfaces including, but not limited to, interface 339, interface 240, and the like. Settings 348 can permit customization of persisted annotation including, client-side settings, server-side settings, and the like.

Client 310 can be a hardware/software entity able to execute cobrowsing application 330. Client 310 can include, but is not limited to, hardware 312, software 314, and the like. Client 310 can be, but is not limited to, desktop computer, laptop computer, mobile phone, portable computing device, tablet computing device, portable digital assistant (PDA), and the like. Hardware 312 can be one or more physical component comprising of processor 320, volatile memory 322, non-volatile memory 324, bus 326, and the like. Software 314 can comprise of cobrowsing application 330, an operating system (not shown), and the like.

Drawings presented herein are for illustrative purposes only and should not be construed to limit the invention in any regard. System 300 can be a component of a distributed computing system, networked computing environment, cloud computing system, and the like. Network 370 can include, but is not limited to, public network, private network, Virtual Private Network (VPN), and the like. It should be appreciated system 300 can be integrated within an existing collaboration infrastructure enabling functionality of traditional collaboration software to be easily extended.

System 300 architecture can include, but is not limited to, publish/subscribe, event driven, and the like. In one embodiment, system 300 can employ a Representational State Transfer Architecture (REST). In one instance, system 300 can be a component of a Service Oriented Architecture. It should be noted that system 300 can function in real-time and/or near real-time. In one instance, system 300 can utilize a real-time protocol to achieve real-time functionality. In the instance, system 300 can include, but is not limited to, Real-Time Transport Protocol (RTP), Session Initiated Protocol (SIP), Transport Control Protocol/Internet Protocol (TCP/IP), and the like. For example, annotation features of system 300 can be associated with a telephony collaboration application.

It should be appreciated system 300 can support annotation 338 locking enabling granular control over annotation properties. In one instance, annotation 338 position can be locked disallowing movement of annotations within interface 339.

In one instance, annotation 338 can be cached within client 310 prior to synchronization to compensate for communication outages. In the instance, memory 322, 324 can be employed to temporarily store annotation 338 which can be conveyed to relevant interfaces when client 310 is communicatively linked to server 340.

It should be appreciated; manager 346 can permit traditional and/or proprietary security mechanisms to be utilized within system 300. Further, system 300 can be associated with multiple security mechanisms including, but not limited to, Public Key Infrastructure (PM), private key encryption, and the like.

In one embodiment, server 340 can be a component of an IBM WEBSPHERE software/middleware. In the embodiment, server 340 can be a functionality of an IBM COMMUNICATIONS ENABLED APPLICATIONS software.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for persisting cobrowsing annotations among a plurality of cobrowsing sessions and system comprising at least one hardware processor, tangible storage memory, and bus connecting said processor and tangible storage memory, said tangible storage memory operable to store at least one computer program product executable upon the at least one processor, said system further comprising:
    an annotation manager able to automatically persist a cobrowsing annotation within a first cobrowsing session of a cobrowsing application when the first cobrowsing session is terminated, wherein the cobrowsing annotation is retrievable for a subsequent cobrowsing session after the termination of the first cobrowsing session;
    a synchronization engine configured to:
    receive an annotation event in the subsequent cobrowsing session, wherein the annotation event is associated with a user interface used in the subsequent cobrowsing session;
    responsive to the annotation event, automatically retrieve the cobrowsing annotation persisted from the first cobrowsing session into the subsequent cobrowsing session;
    perform a synchronization event associated with a plurality of interfaces interacting with within the subsequent cobrowsing session, wherein performing the synchronization comprises providing the received cobrowsing annotation to the plurality of interfaces; and
    a security handler able to authorize an interface participating within the subsequent cobrowsing session, wherein the interface is associated with a user identity.

2. The system of claim 1, wherein the annotation event is associated with the subsequent cobrowsing session of the cobrowsing application, wherein the annotation event is at least one of a cobrowsing annotation creation, modification, and deletion.

3. The system of claim 1, further comprising:
    a session data entity associated with the first cobrowsing session, wherein the session data entity comprises of at least an interface identifier, a URI, a user identity, an expiration value, a visibility property, and an annotation.

4. The system of claim 1, further comprising:
    a toolbar comprising of at least one annotation control, wherein the annotation control is at least one of an annotation creation control, an annotation modification control, and an annotation deletion control.

5. The system of claim 1, wherein the cobrowsing annotation is presented within an annotation frame, wherein the annotation frame is a window interface element.

6. The system of claim 1, wherein the cobrowsing annotation is a predefined template, wherein the predefined template can automatically configure the annotation based one or more template settings.

7. The system of claim 1, wherein the cobrowsing annotation is associated with a visibility property, wherein the visibility property is associated with at least one of a user and a group.

8. The system of claim 7, wherein the visibility property is modified by a context menu.

9. The system of claim 1, wherein a change history of the cobrowsing annotation is created in addition to the persisting cobrowsing annotation.

10. The system of claim 9, wherein the change history of the cobrowsing annotation is stored as deltas to an original annotation persisted prior to the first cobrowsing session.

11. An apparatus including an interface for persisting cobrowsing annotations among a plurality of cobrowsing sessions comprising:
    a tangible memory storing at least one computer program product;
    a hardware processor operable to execute the computer program product to cause the interface window to be displayed by the display hardware; and
    the computer program product when executed by the processor being operable to receive a request to navigate to a Uniform Resource Identifier (URI) within a subsequent cobrowsing session, wherein the subsequent cobrowsing session is associated with a unique session identifier, wherein the subsequent cobrowsing session is associated with a cobrowsing application, wherein the cobrowsing application is a portion of a collaboration software;
    the computer program product when executed by the processor being operable to automatically retrieve a cobrowsing annotation that was automatically persisted when a first cobrowsing session was terminated, wherein the cobrowsing annotation was previously associated with the URI from the first cobrowsing session that is a historic cobrowsing session;
    the computer program product when executed by the processor being operable to obtain content associated with the URI and present the obtained content within interfaces associated with the subsequent cobrowsing session; and
    the computer program product when executed by the processor being operable to synchronize the retrieved cobrowsing annotation to the plurality of interfaces of the subsequent cobrowsing session;
    the computer program product when executed by the processor being operable to automatically present the cobrowsing annotation within the content associated with the URI of the interfaces of the subsequent cobrowsing session, wherein the cobrowsing annotation is presented proximate to a portion of the content associated with the URI.

12. The interface of claim 11, wherein the cobrowsing annotation is associated with a visibility property, wherein the visibility property establishes authorized interfaces permitted to receive the annotation.

13. The interface of claim 11, wherein the cobrowsing annotation is presented as a graphic overlay within the content, wherein the graphic overlay is a text area displaying the annotation.

14. The apparatus of claim 11, further comprising a session data entity associated with the second cobrowsing session, wherein the session data entity comprises a user identity.

15. The apparatus of claim 11, further comprising a toolbar comprising of a mode identifier.

16. The apparatus of claim 11, wherein the cobrowsing annotation is presented within an annotation frame, wherein the annotation frame is a window interface element of one of the plurality of interfaces of the second cobrowsing session.

17. The apparatus of claim 11, wherein the cobrowsing annotation is a template specified annotation.

18. The system of claim 11, wherein a change history of the cobrowsing annotation is created in addition to the persisting cobrowsing annotation when the first cobrowsing session is terminated.

19. The apparatus of claim 18, wherein the change history of the cobrowsing annotation is stored as deltas to an original annotation persisted prior to the first cobrowsing session.

20. A system for persisting cobrowsing annotations for cobrowsing sessions, the system comprising at least one hardware processor, tangible storage memory, and bus connecting said processor and tangible storage memory, said tangible storage memory operable to store at least one computer program product executable upon the at least one processor, the system further comprising:
    an annotation manager able to:
        automatically persist a cobrowsing annotation within a first cobrowsing session of a cobrowsing application when the first cobrowsing session is terminated, wherein the cobrowsing annotation is retrievable for a subsequent cobrowsing session after the termination of the first cobrowsing session; and
        store changes to the cobrowsing annotation separately from the cobrowsing annotation enabling a change history to be cataloged;
    a synchronization engine configured to:
        retrieve the cobrowsing annotation persisted in the first cobrowsing session from a subsequent cobrowsing session;
        receive an annotation event in the subsequent cobrowsing session, wherein the annotation event is associated with a user interface used in the subsequent cobrowsing session, wherein responsive to the annotation event, automatically performing a synchronization event associated with a plurality of interfaces interacting within the subsequent cobrowsing session wherein performing the synchronization comprises providing the automatically retrieved cobrowsing annotation persisted from the first cobrowsing session to the plurality of interfaces of the subsequent cobrowsing session; and
    a security handler able to authorize an interface participating within the subsequent cobrowsing session, wherein the interface is associated with a user identity.

* * * * *